United States Patent [19]

Egawa

[11] Patent Number: 4,951,792
[45] Date of Patent: Aug. 28, 1990

[54] CLUTCH MECHANISM IN GEAR TRANSMISSION

[75] Inventor: Masanori Egawa, Chiryu, Japan

[73] Assignee: Sumitomo Heavy Industries, Ltd., Tokyo, Japan

[21] Appl. No.: 327,671

[22] Filed: Mar. 23, 1989

[30] Foreign Application Priority Data

Mar. 29, 1988 [JP] Japan .............................. 63-41684[U]

[51] Int. Cl.⁵ .............................................. F16D 11/10
[52] U.S. Cl. .................................... 192/67 R; 74/333; 192/95
[58] Field of Search ......................... 192/67 R, 20, 95; 74/416, 333

[56] References Cited

U.S. PATENT DOCUMENTS

| | | | |
|---|---|---|---|
| 1,784,722 | 12/1930 | Carickhoff | 192/67 R |
| 2,183,667 | 12/1939 | Buckendale | 192/67 R X |
| 2,662,800 | 12/1953 | Hoffman | 74/333 X |
| 2,685,210 | 8/1954 | Heisler | 74/333 X |
| 2,890,772 | 6/1959 | Bixby | 74/333 X |
| 3,648,546 | 3/1972 | McNamara et al. | 74/333 X |
| 4,618,046 | 10/1986 | Sassen | 192/67 R X |

FOREIGN PATENT DOCUMENTS 247521 5/1912 Fed. Rep. of Germany .
2758494 12/1978 Fed. Rep. of Germany .
2345629 10/1977 France .
2073337 4/1980 United Kingdom .

Primary Examiner—Rodney H. Bonck
Attorney, Agent, or Firm—Armstrong, Nikaido, Marmelstein, Kubovcik & Murray

[57] ABSTRACT

A clutch mechanism in a gear transmission. A first gear is fixed to one of input and output shaft disposed in parallel with each other, while a second gear engaging with the first gear is fitted on the other. The second gear is rotatable and axially slidable relative to the other shaft, and two groups of splines are formed in the fitting surfaces of the second gear and the other shaft and are capable of engaging with and disengaging from each other in response to the axial sliding of the second gear. With this mechanism, the transmission of rotation of the input shaft to the output shaft is established and interrupted by axially moving the second gear. Also disclosed is another clutch mechanism in a gear transmission. A second gear is loosely fitted on the other shaft, while a third gear is fitted on the other shaft in such a manner as to be prevented from rotating relative to the other shaft but be axially slidable relative thereto. With this mechanism, the third gear is axially slid to become engaged with the second gear or become disengaged therefrom, thereby establishing and interrupting the transmission of rotation of the input shaft to the output shaft.

1 Claim, 7 Drawing Sheets

CLUTCH MECHANISM IN GEAR TRANSMISSION

BACKGROUND OF THE INVENTION

1. Field of the Invention

The present invention relates to a clutch mechanism in a gear transmission which is used to establish and interrupt the transmission of rotation from an input shaft to an output shaft.

2. Description of the Prior Art

Hitherto, gear transmission apparatus are known in which the transmission of rotation is established and interrupted by a clutch having pawls. An example of such an apparatus will be described with reference to FIGS. 1 and 2.

An electric motor 41 has its rotary shaft extending to the inside of a casing 42 where the rotary shaft serves as an input shaft 43. An externally toothed input gear 44 is fitted on the input shaft 43 and fixed thereto, while it is in meshing engagement with an externally toothed output gear 45, so that the speed of rotation of the input shaft 43 can be changed (reduced or increased). The externally toothed output gear 45 is loosely fitted on an output shaft 46. An annular, stationary clutch component 48 is fixed by means of bolts 47 to one end face of the externally toothed output gear 45. On the other hand, a slidable clutch component 49 is provided in opposition to the stationary clutch component 48. These clutch components 48 and 49 constitute a clutch. The slidable clutch component 49 is arranged through a sliding key 50 fixed to the output shaft 46, in such a manner that the clutch component 49 is axially slidable relative to the output shaft 46 and is prevented from rotating relative thereto. The sliding key 50 is fitted in a keyway 51 formed in the output shaft 46. The sliding clutch component 49 has an engagement groove 52 formed in the outer periphery thereof and engaging with a shifting device, described later. On the end faces of the clutch components 48 and 49 on which they oppose each other, engagement pawls are provided. As shown in FIG. 2, the engagement pawls comprise several circular-arc recesses 53 and projections 54 which are alternately formed around the circumference.

The engagement pawls operate in the following manner.

When the slidable clutch component 49 is slid by the shifting device, the clutch components 48 and 49 have their engagement pawls engaged or disengaged. If the clutch is engaged, this causes the output shaft 46 to rotate integrally with the externally toothed output gear 45. If the clutch is disengaged, the transmission of rotation via the externally toothed output gear 45 to the output shaft 46 is interrupted.

The output shaft 46 and the input shaft 43 are disposed in parallel with each other. Bearings 56 and 57 are interposed between the output shaft 46, on one hand, and the casing 42 or a cover 55, on the other. The output shaft 46 is rotatably supported by these bearings 56 and 57.

The shifting device has the following construction.

A cam shaft 58 is inserted through and fitted to the casing 42. A roller shaft 59 is threaded into that end portion of the cam shaft 58 within the casing 42, in such a manner as to be eccentric with respect to the axial center of the cam shaft 58. A roller 61 is fitted on the roller shaft 59 via a bush 60, while rotatably fitted in the engagement groove 52 of the slidable clutch component 49.

With this construction, therefore, when a rotary grip 62 which is threaded into the vicinity of the extra-casing end of the cam shaft 58 is rotated, the slidable clutch component 49 is slid axially on the output shaft 46.

However, the above-described conventional clutch mechanism encountered various problems such as the following:

Because the numbers of the recesses 53 and the projections 54 forming the engagement pawls are small, the following risk is involved. When the clutch components are to be coupled, if the recesses and the projections of the clutch components 48 and 49 are at certain positions, the projections 53 of one clutch component may abut against those of the other, thus resulting in insecure engagement. In order to avoid this risk, in a conventional clutch mechanism, the output shaft 46 is rotated by a small amount whereby the position of the recesses and the projections is changed in order to achieve meshing engagement. This operation, however, has adversely affected operability.

Further, because the clutch components 48 and 49 are formed with engagement pawls on the respective end faces, this makes it difficult to mass-produce these components, and incurs high production cost.

Still further, the engagement of the conventional clutch mechanism requires two clutch components 48 and 49, and several bolts 47 for fixing the stationary clutch component 48 to the externally toothed output gear 45. As a result, the number of component parts required is large, thereby causing an increase in the production cost, and complicating the entire apparatus.

SUMMARY OF THE INVENTION

An object of the present invention is to provide a mechanism for use in a gear transmission to establish and interrupt the transmission of rotation, which does not require the operation of rotating the output shaft when engagement and disengagement is to be achieved, and which is featured by a meshing engagement portion that can be formed easily and that renders the mechanism suitable for mass-production, and a small number of component parts that renders the mechanism compact.

In order to achieve the above-stated object, according to one aspect of the present invention, there is provided a clutch mechanism in a gear transmission comprising: first and second rotary shafts disposed in parallel with each other; a first gear fixed to the first rotary shaft; a second gear operatively engaging with the first gear and having a fitting hole fitting on the second rotary shaft in such a manner that the second gear is rotatable and axially slidable relative to the second rotary shaft; splines formed on part of the outer peripheral surface of the second rotary shaft; splines formed on the inner peripheral surface of the fitting hole of the second gear, the splines of the second gear being engaged with the splines of the second rotary shaft when the second gear is at a first position thereof in the axial direction of the second rotary shaft, and being disengaged therefrom when the second gear is at its second axial position; and a shifting device capable of moving the second gear along the second rotary shaft between the first and second positions.

Also for the achievement of the above-stated object, another aspect of the present invention provides a clutch mechanism in a gear transmission comprising:

first and second rotary shafts disposed in parallel with each other; a first gear fixed to the first rotary shaft; a second gear operatively engaging with the first gear and capable of idly rotating; a third gear fitted on the second rotary shaft in such a manner that the third gear is prevented from rotating relative to the second rotary shaft but is axially slidable relative thereto, the third gear being engaged with the second gear when the third gear is at a first position thereof in the axial direction of the second shaft, and being disengaged therefrom when the third gear is at its second axial position; and a shifting device capable of moving the third gear along the second rotary shaft between the first and second positions.

These and other objects, arrangements, operations and effects of the present invention will become more apparent from the following description of embodiments with reference to the drawings.

DESCRIPTION OF THE PREFERRED EMBODIMENTS

One embodiment of the present invention will be described with reference to FIGS. 3, 4, and 5.

Figure 3:
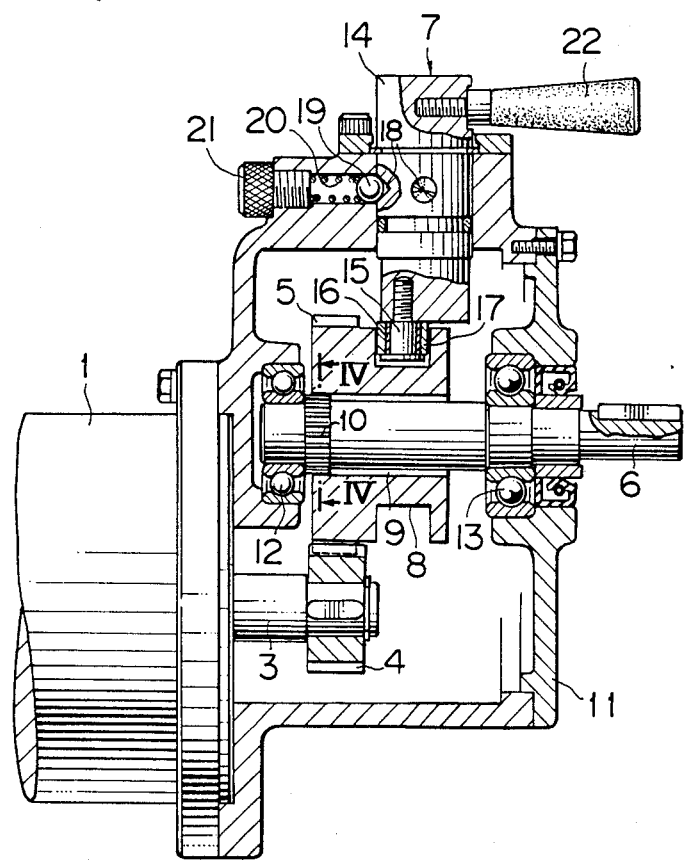
FIG. 3 is a longitudinal sectional view of one embodiment of the present invention.
Figure 4:
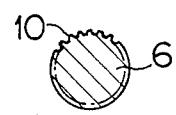
FIG. 4 is a sectional view taken along the line IV—IV shown in FIG. 3.

Referring to FIG. 3, a rotary shaft of an electric motor 1 extends to the inside of a casing 2 where the rotary shaft serves as an input shaft 3. An externally toothed input gear 4 is fixed to the input shaft 3. The externally toothed input gear 4 engages with an externally toothed slidable gear 5 having a greater number of teeth than the externally toothed input gear 4, so that the speed of rotation of the input shaft 3 can be reduced. However, the present invention also includes, in addition to such a reduction mechanism, an increasing mechanism in which an externally toothed slidable gear having a smaller number of teeth than the externally toothed input gear 4 is provided to increase the speed.

Figure 1:
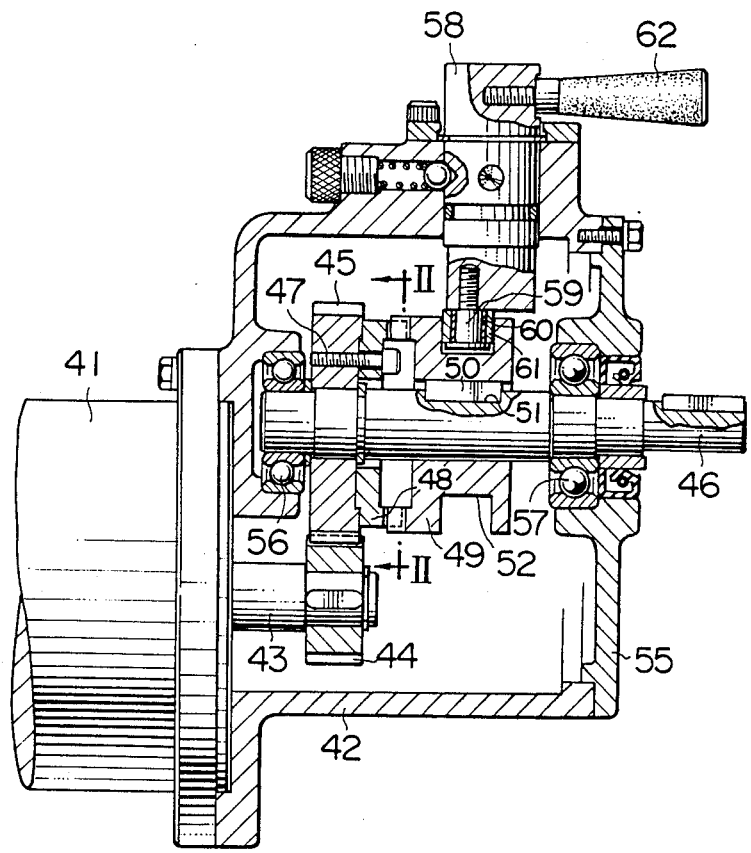
FIG. 1 is a longitudinal sectional view of a conventional clutch mechanism in a gear transmission.
Figure 2:
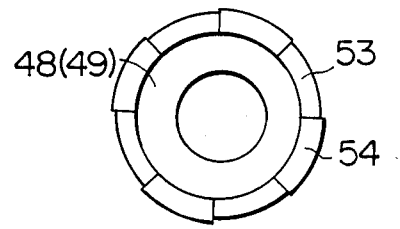
FIG. 2 is a front view of the clutch, taken along the line II—II shown in FIG. 1.

The externally toothed slidable gear 5 is fitted on an output shaft 6 in such a manner as to be slidable in the axial direction of the output shaft 5. The externally toothed slidable gear 5 has an engagement groove 8 formed in an outer peripheral portion which is beside the toothed surface. The engagement groove 8 engages with a shifting device 7, described later. Splines 9 are formed in the inner peripheral surface of the fitting hole of the externally toothed slidable gear 5, while other splines 10 are formed in the outer peripheral surface of the output shaft 6. These two groups of the splines 9 and 10 can be engaged with and disengaged from each other by causing the sliding of the externally toothed slidable gear 5. As shown in FIG. 4, the splines 10 formed in the output shaft 6 linearly extend in the axial direction of the output shaft 6, and the number of the splines 10 provided is greater than that of the known pawls shown in FIG. 2.

The output shaft 6 is disposed in parallel with the input shaft 3. Bearings 12 and 13 are interposed between the output shaft 6, on one hand, and the casing 2 or a cover 11. The output shaft 6 is rotatably supported by these bearings 12 and 13.

The shifting device 7 has a construction similar to the known construction, which is as follows:

A cam shaft 14 is inserted through and fitted to the casing 2. A roller shaft 15 is threaded into that end portion of the cam shaft 14 within the casing 2, in such a manner as to be eccentric with respect to the axial center of the cam shaft 14. A roller 17 is loosely fitted on the roller shaft 15 via a bush 16, while rotatably fitted in the engagement groove 8 formed in the externally toothed slidable gear 5. The cam shaft 14 has two ball-engagement recesses 18 formed in the axially intermediate peripheral surface thereof at intervals corresponding to a predetermined angle with respect to the axial center of the cam shaft 14. A ball 19 capable of engaging with either of the ball-engagement recesses 18, and a pressure spring 20 urging the ball 19 toward the ball-engagement recesses 18 are inserted together through the casing 2. The other end of the pressure spring 20 abuts against a pressure adjusting bolt 21 so that the pressure applied can be adjusted by means of the adjusting bolt 21.

A rotary grip 22 for causing the rotation of the cam shaft 14 is threaded into the vicinity of the extra-casing end of the cam shaft 14.

The embodiment having the above-described arrangement operates in the following manner.

The externally toothed slidable gear 5 always engages with the externally toothed input gear 4.

In the state shown in FIG. 3, the clutch of the mechanism is engaged, i.e., the splines 9 and the splines 10 are coupled to each other, and, with this state, the rotation of the input shaft 3 can be transmitted to the output shaft 6. Specifically, when the rotary grip 22 is manually rotated to cause the rotation of the cam shaft 14, this causes, through the roller 17 eccentrically mounted on the cam shaft 14, the sliding of the externally toothed slidable gear 5. This sliding of the gear 5 in turn brings forth fitting engagement between the splines 9 of the externally toothed slidable gear 5 and the splines 10 of the output shaft 6, thereby connecting the externally toothed slidable gear 5 to the output shaft 6. As a result, the externally toothed slidable gear 5 rotates integrally with the output shaft 6, thereby transmitting the rotation of the input shaft 3 to the output shaft 6.

In this way, the connection between the externally toothed slidable gear 5 and the output shaft 6 is achieved by coupling the two groups comprising the plurality of splines 9 and 10. Since a lot of meshing engagement points are provided for this coupling, there is no need to perform the operation of rotating the output shaft 6.

Figure 5:
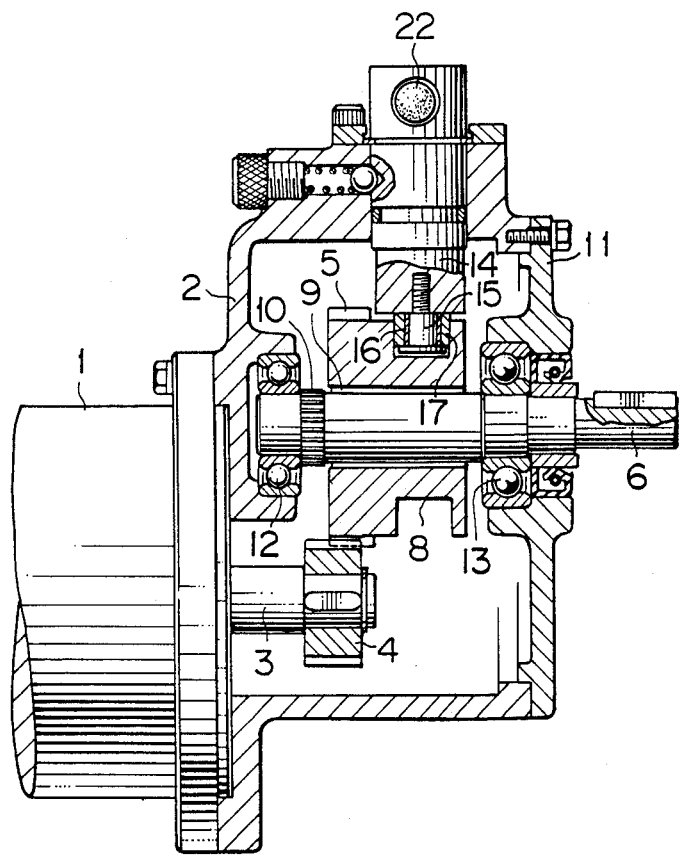
FIG. 5 is a fragmentary sectional view, showing a state in which the clutch is disengaged in the embodiment shown in FIG. 3.

On the other hand, when the rotary grip 22 is rotated from the state shown in FIG. 3, and the externally toothed slidable gear 5 is caused to slide rightward, as viewed in the drawing, until the positional relationship shown in FIG. 5 is achieved, the splines 9 of the externally toothed slidable gear 5 are released from their engagement with the splines 10 of the output shaft 6. At this time, therefore, the transmission of rotation via the externally toothed slidable gear 5 to the output shaft 6 is interrupted.

The above described arrangement is a mere example, and the present invention is not limited thereto. For instance, another gear may be interposed between the externally toothed input gear 4 and the externally toothed slidable gear 5. In addition, gears which can be used are not limited to externally toothed gears, and it is also possible to use internally toothed gears.

Next, another embodiment of the present invention will be described with reference to FIG. 6.

In the drawing, since members denoted by the same reference numerals as those in FIG. 3 are the same as the corresponding members shown in FIG. 3, descriptions concerning those members will be omitted.

Figure 6:
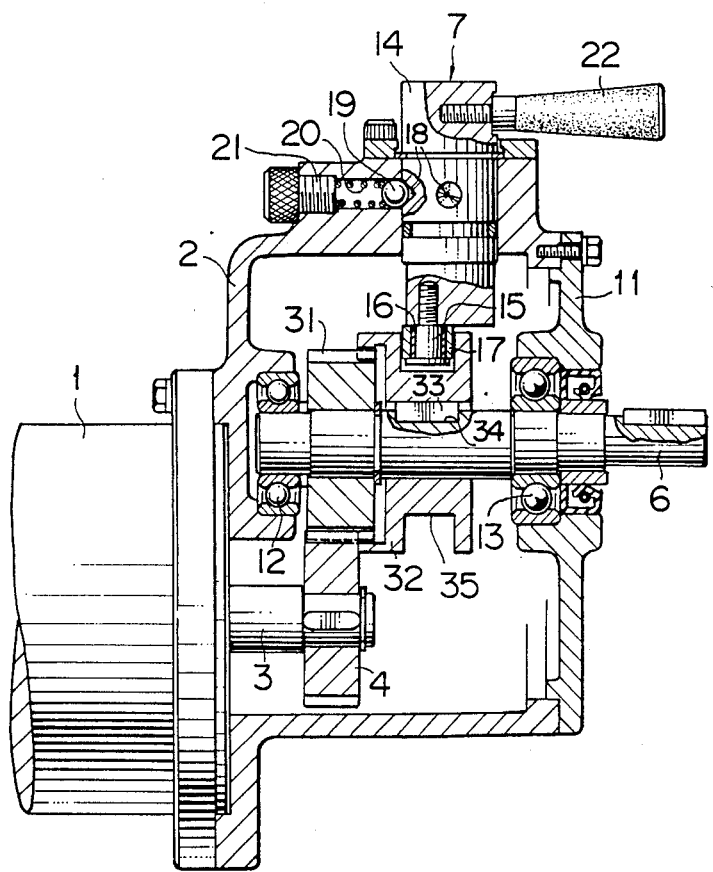
FIG. 6 is a longitudinal sectional view of another embodiment of the present invention.

The embodiment shown in FIG. 6 is distinguished in that a part of the teeth of the loosely fitted gear is used also as one group of splines, and an internally toothed gear slidably mounted on the output shaft is adapted to be engaged with or disengaged from those teeth.

Specifically, the externally toothed input gear 4 is kept in meshing engagement with an externally toothed gear 31 so as to change the speed of rotation of the input shaft 3. The externally toothed gear 31 is loosely fitted on the output shaft 6, and a part of the teeth of the gear 31 is adapted to be engaged with and disengaged from an internally toothed slidable gear 32. Alternatively, the output shaft 6 and the shaft on which the externally toothed gear 31 is loosely fitted may be separate shafts. By virtue of the provision of a sliding key portion 33 and a keyway 34, the internally toothed slidable gear 32 is slidable in the axial direction of the output shaft 6, while prevented from rotating relative to the output shaft 6. The outer periphery of the internally toothed slidable gear 32 is formed with an engagement groove 35 engaging with the shifting device 7. The internally toothed slidable gear 32 can be slid to come into engagement with the externally-toothed loosely-fit gear 31 or to become released from its engagement therewith.

This embodiment having the above-described arrangement operates in the following manner.

When the internally toothed slidable gear 32 is in meshing engagement with the externally-toothed loosely-fit gear 31, the rotation of the input shaft 3 is transmitted to the internally toothed slidable gear 32 via the externally toothed input gear 4 and the externally-toothed loosely-fit gear 31, and the rotation is further transmitted from the gear 32 to the output shaft 6.

When the shifting device 7 is operated in such a manner as to release the internally toothed slidable gear 32 from its meshing engagement with the externally-toothed loosely-fit gear 31, this leads to the effect that the rotation of the input shaft 3 causes only the idle rotation of the externally-toothed loosely-fit gear 31 and, hence, the rotation is not transmitted to the output shaft 6.

The operation of this embodiment also enjoys the advantage in which, by virtue of large numbers of teeth of the externally-toothed loosely-fit gear 31 and the internally toothed slidable gear 32, there are a lot of points at which teeth of these gears can come into meshing engagement, whereby the meshing engagement and hence the coupling is facilitated. As a result, in comparison with the conventional arrangement where meshing engagement is achieved by means of pawls, it is no more necessary to adjust the meshing engagement position by rotating the gear.

The present invention is not limited to the above-described example. For instance, another gear may be interposed between the externally toothed input gear 4 and the externally-toothed loosely-fit gear 31. Also, it is possible to substitute the externally toothed gears with internally toothed gears.

Figure 7:
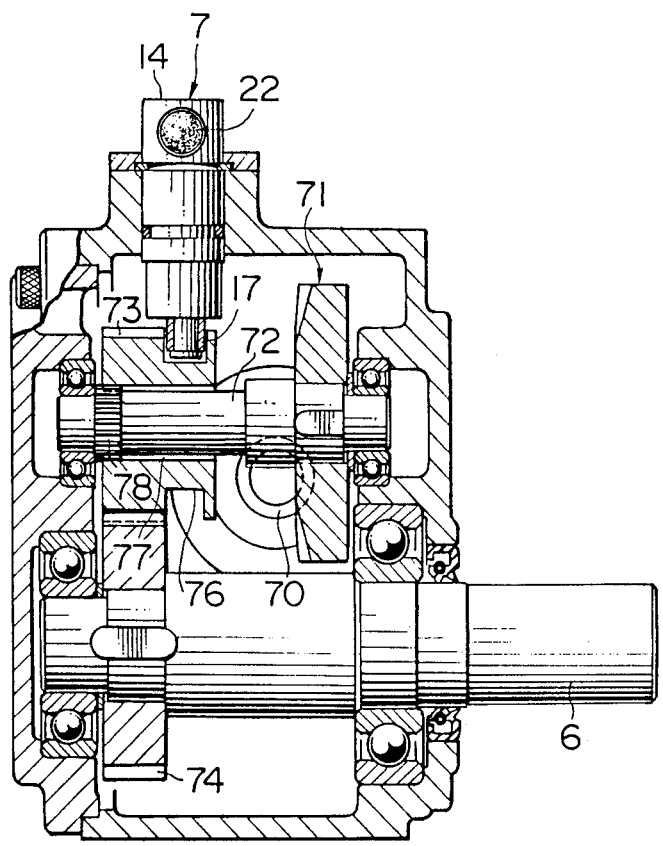
FIG. 7 is a longitudinal sectional view of a further embodiment of the present invention.
Figure 8:
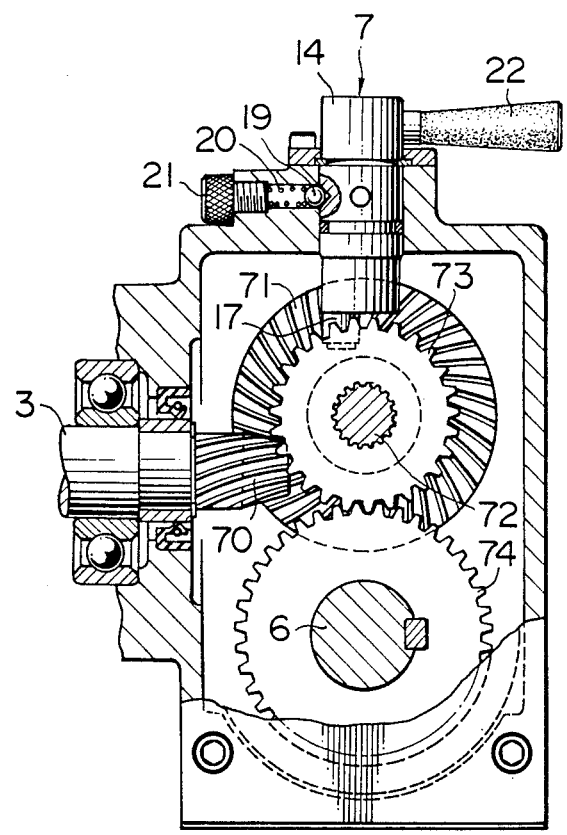
FIG. 8 is a transverse sectional view of the embodiment shown in FIG. 7.

Next, a further embodiment will be described with reference to FIGS. 7 to 9. This embodiment is distinguished from the embodiment shown in FIGS. 3 to 5 in that an input shaft is disposed normal to the output shaft, an externally toothed gear is fixed to the output shaft, and an externally toothed slidable gear is slidable fitted on a shaft on the input side. However, the construction of the clutch mechanism is not different in principle.

A hypoid pinion 70 is formed at one end of an input shaft 3 driven by an electric motor (not shown). A hypoid gear 71 engaging with the hypoid pinion 70 is fixed to an intermediate shaft 72 extending normal to the input shaft 3. An externally toothed slidable gear 73 is fitted on the intermediate shaft 72 in such a manner as to be axially slidable, while an externally toothed output gear 74 engaging with the externally toothed slidable gear 73 is fixed to an output shaft 6 disposed in parallel with the intermediate shaft 72. In the illustrated example, the externally toothed output gear 74 has a greater number of teeth than the externally toothed slidable gear 73, so that the speed of rotation of the output shaft 6 is reduced from that of the intermediate shaft 72. However, it would be clear that the present invention may be also applied to the case where the externally toothed output gear 74 has a smaller number of teeth than the externally toothed slidable gear 73 so as to increase the speed of rotation of the output shaft 6.

The externally toothed slidable gear 73 fitted on the intermediate shaft 72 has exactly the same structure as that of the externally toothed slidable gear 5 fitted on the output shaft 6, shown in FIG. 3, with an engagement groove 76 engaging with a shifting device 7 being formed in an outer peripheral portion of the externally toothed slidable gear 73 which is beside the toothed surface. Since the shifting device 7 has exactly the same construction as that described before with reference to FIG. 3, detailed description concerning the device 7 will be omitted, using the same reference numerals to denote the same component parts. Splines 77 and splines 78 are formed respectively in the inner peripheral surface of the fitting hole of the externally toothed slidable gear 73 and in the outer peripheral surface of the intermediate shaft 72. These splines 77 and 78 are adapted to become engaged with and disengaged from each other by causing the externally toothed slidable gear 73 to slide axially by operating the shift device 7.

This embodiment having the above-described arrangement operates in the following manner.

The intermediate shaft 72 is always driven and rotated by the electric motor via the input shaft 3 and the meshing engagement between the hypoid pinion 70 and the hypoid gear 71. When the rotary grip 22 of the shifting device 7 is manually rotated to cause, through the roller 17, the sliding of the externally toothed slidable gear 73 to the position shown in FIG. 7, the splines 77 and the splines 78 become engaged with each other, thereby allowing the externally toothed slidable gear 73 to rotate together with the intermediate shaft 72. As a result, the externally toothed output gear 74 engaging with the externally toothed slidable gear 73 rotates, thus causing the rotation of the output shaft 6.

Figure 9:
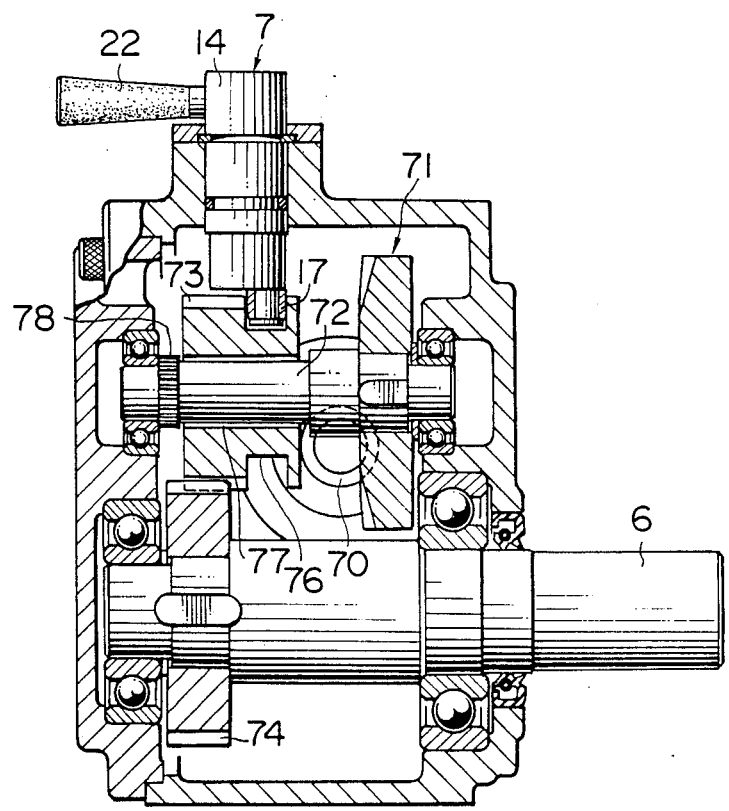
FIG. 9 is a longitudinal sectional view, showing a state in which the clutch is disengaged in the embodiment shown in FIG. 7.

On the other hand, when the rotary grip 22 is rotated in the reverse direction to achieve the state shown in FIG. 9, the externally toothed slidable gear 73 is slid rightward, as viewed in the figure. By this action, the splines 77 become disengaged from the splines 78, thereby interrupting the transmission of rotation of the intermediate shaft 72 to the externally toothed slidable gear 73. As a result, the output shaft 6 is disconnected from the input shaft 3 and the intermediate shaft 72, and stops rotating.

According to the present invention, the following effects are provided.

With the rotation transmitting mechanism of the present invention, either an externally toothed slidable gear and an output shaft are connected by coupling two groups of splines, or an externally-toothed loosely-fitted gear and an internally toothed slidable gear are connected by being brought into meshing engagement with each other. Thus, the connection enjoys a lot of meshing engagement points, and this in turn renders unnecessary the operation of rotating the output shaft for achieving coupling and meshing engagement.

In addition, since the splines, the externally toothed gear, and the internally toothed gear can be worked easily by the use of machines, the clutch mechanism can be mass-produced, thereby enabling a reduction in production cost.

Further, it is possible to reduce the number of component parts of the clutch mechanism, thereby enabling a reduction in the production cost and in the size of the entire transmission.

What is claimed is:

1. A clutch mechanism in a gear transmission comprising: a rotary output shaft and an intermediate rotary shaft disposed in parallel with each other; a hypoid gear fixed to said intermediate shaft, said hypoid gear and said intermediate shaft being driven by a hypoid pinion in engagement with said hypoid gear and mounted on an input shaft perpendicular to said intermediate shaft and said output shaft; a first gear fixed to said output shaft; a second gear operatively engaging with said first gear and having a fitting hole fitted on said intermediate shaft in such a manner that said second gear is rotatable and axially slidable relative to said intermediate shaft; splines formed on part of the outer peripheral surface of said intermediate shaft; splines formed on the inner peripheral surface of said fitting hole of said second gear, said splines of said second gear being engaged with said splines of said intermediate shaft when said second gear is at a first axial position on said intermediate shaft, and being disengaged therefrom when said second gear is at a second axial position; and a shifting device for moving said second gear along said intermediate shaft between said first and second positions.

* * * * *